United States Patent
Kim et al.

(10) Patent No.: US 10,573,317 B2
(45) Date of Patent: Feb. 25, 2020

(54) SPEECH RECOGNITION METHOD AND DEVICE

(71) Applicant: Samsung Electronics Co., Ltd., Gyeonggi-do (KR)

(72) Inventors: Yongwook Kim, Seoul (KR); Jamin Goo, Gyeonggi-do (KR); Gangheok Kim, Gyeonggi-do (KR); Dongkyu Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1 day.

(21) Appl. No.: 16/103,195

(22) Filed: Aug. 14, 2018

(65) Prior Publication Data

US 2019/0057701 A1 Feb. 21, 2019

(30) Foreign Application Priority Data

Aug. 16, 2017 (KR) .......................... 10-2017-0103571

(51) Int. Cl.
*G10L 15/26* (2006.01)
*G10L 15/02* (2006.01)
(Continued)

(52) U.S. Cl.
CPC .............. *G10L 15/26* (2013.01); *G10L 15/02* (2013.01); *G10L 15/22* (2013.01); *G10L 15/30* (2013.01); *G10L 15/01* (2013.01)

(58) Field of Classification Search
CPC .......... G10L 15/01; G10L 15/22; G10L 15/26
See application file for complete search history.

(56) References Cited

U.S. PATENT DOCUMENTS 5,524,169 A * 6/1996 Cohen ..................... G10L 15/26
704/231
5,774,859 A * 6/1998 Houser ............... H04N 5/44543
348/E5.103

(Continued)

FOREIGN PATENT DOCUMENTS

KR 10-2010-0083572 A 7/2010
KR 10-2015-0112168 A 10/2015

OTHER PUBLICATIONS

European Search Report dated Nov. 20, 2018.

*Primary Examiner* — Samuel G Neway
(74) *Attorney, Agent, or Firm* — Cha + Reiter, LLC.

(57) ABSTRACT

An electronic device and method are disclosed herein. The electronic device implements the method, including: receiving a first speech, and extracting a first text from the received first speech, in response to detecting that extraction of the first text includes errors such that a request associated with the first speech is unprocessable, storing the extracted first text, receiving a second speech and extracting a second text from the received second speech, in response to detecting that the request is processable using the extracted second text, detecting whether a similarity between the first and second texts is greater than a similarity threshold, and whether the second speech is received within a predetermined time duration of receiving the first speech, and when the similarity is greater than the threshold, and the first and second speech signals are received within the time duration, storing the first text in association with the second text.

20 Claims, 12 Drawing Sheets

(51) Int. Cl.
*G10L 15/22* (2006.01)
*G10L 15/30* (2013.01)
*G10L 15/01* (2013.01)

(56) References Cited

U.S. PATENT DOCUMENTS

| | | | | |
|---|---|---|---|---|
| 6,195,635 | B1* | 2/2001 | Wright | G10L 15/08 |
| | | | | 704/231 |
| 9,123,339 | B1* | 9/2015 | Shaw | G10L 15/22 |
| 2004/0024601 | A1 | 2/2004 | Gopinath et al. | |
| 2005/0261903 | A1 | 11/2005 | Kawazoe et al. | |
| 2007/0198269 | A1 | 8/2007 | Braho et al. | |
| 2009/0313016 | A1 | 12/2009 | Cevik et al. | |
| 2010/0004930 | A1 | 1/2010 | Strope et al. | |
| 2010/0076765 | A1* | 3/2010 | Zweig | G10L 15/1822 |
| | | | | 704/255 |
| 2010/0179812 | A1 | 7/2010 | Jang et al. | |
| 2014/0012579 | A1* | 1/2014 | Ganong, III | G10L 15/01 |
| | | | | 704/257 |
| 2015/0228275 | A1* | 8/2015 | Watanabe | G10L 15/142 |
| | | | | 704/275 |
| 2015/0279385 | A1 | 10/2015 | Kim et al. | |
| 2016/0063998 | A1* | 3/2016 | Krishnamoorthy | G10L 15/02 |
| | | | | 704/254 |
| 2019/0057701 | A1* | 2/2019 | Kim | G10L 15/02 |

\* cited by examiner

FIG. 7A

| recognized sentence | occurrence time | response offer sentence |
|---|---|---|
| What time is eat ? | 05 : 28 : 15 | |

FIG. 7B

| recognized sentence | occurrence time | response offer sentence |
|---|---|---|
| What time is eat ? | 05 : 28 : 15 | |
| What time is in ? | 05 : 28 : 20 | |

FIG. 7C

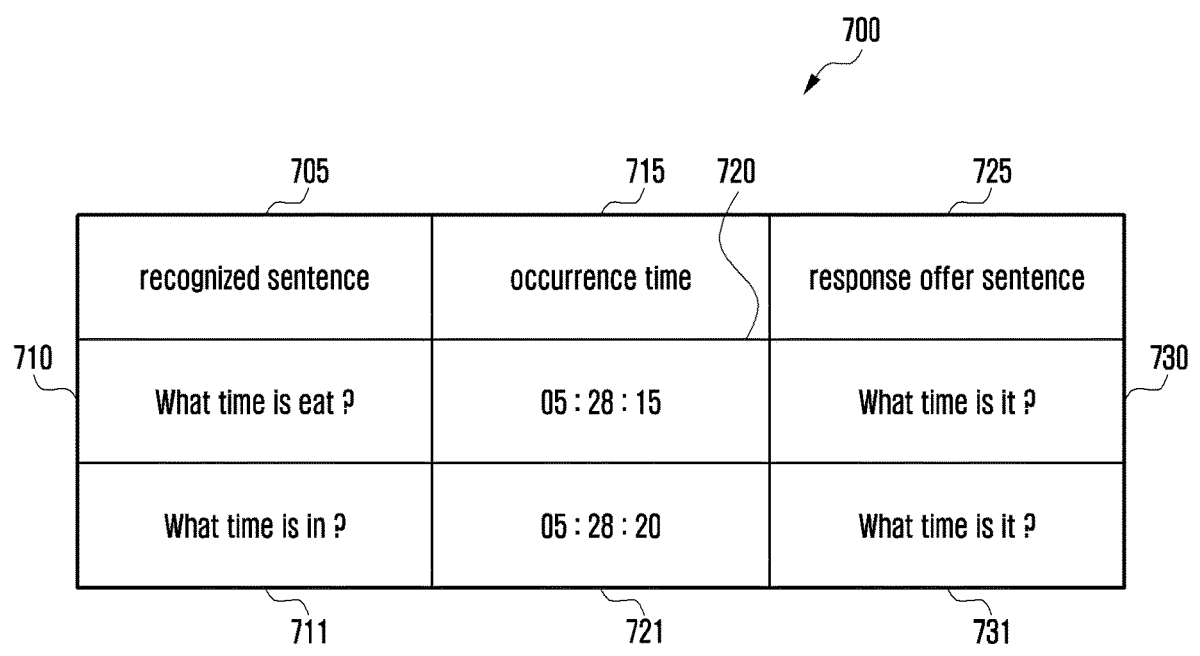

| recognized sentence | occurrence time | response offer sentence |
|---|---|---|
| What time is eat ? | 05 : 28 : 15 | What time is it ? |
| What time is in ? | 05 : 28 : 20 | What time is it ? |

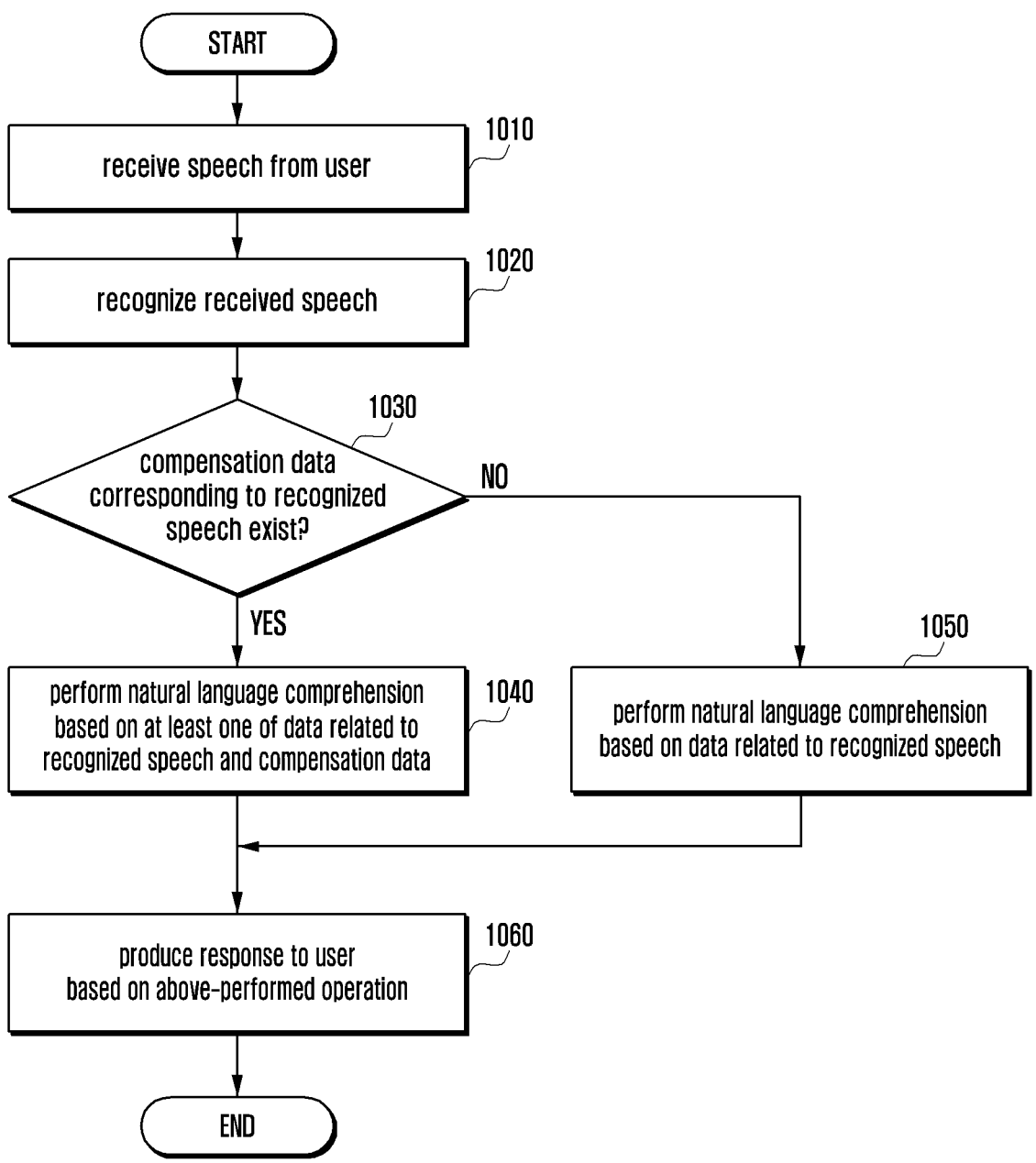

SPEECH RECOGNITION METHOD AND DEVICE

CROSS-REFERENCE TO RELATED APPLICATION(S)

This application is based on and claims priority under 35 U.S.C. § 119 to Korean Patent Application No. 10-2017-0103571, filed on Aug. 16, 2017, in the Korean Intellectual Property Office, the disclosure of which is incorporated by reference herein in its entirety.

TECHNICAL FIELD

Various embodiments of the present disclosure relate to a machine learning algorithm-based artificial intelligence (AI) system and application thereof.

BACKGROUND

An AI system is a computer system that aims to make it possible for a machine to imitate human-level intelligence through self-learning-based recognition enhancement. AI technology can be implemented with the "machine learning" technique (e.g., deep learning), which is based on a self-learning algorithm for sorting/learning properties of input data and other component techniques for mimicking perceptional and judgmental abilities of the human brain, with the assistance of the machine learning algorithm.

Such component techniques often include at least one of a language comprehension technique for comprehending human language/characters, a visual comprehension technique for recognizing objects in human vision, an inference/prediction technique for generating logical inferences and predictions by analyzing information, a knowledge expression technique for expressing human's experience information as knowledge data, and an action control technique for controlling actions of a robot.

The language comprehension technique is a technique for recognizing a human language/characters and processing the recognition result for various application such as natural language processing, machine translation, dialog system, question and answer, and speech recognition/synthesis.

SUMMARY

When an electronic device converts a speech signal input by a user to a word or a sentence by means of an automatic speech recognition (ASR), it may occur that the converted word or sentence is not appropriate for natural language understanding (NLU). For example, if an ASR result is not ambiguous in meaning, the electronic device may present an unintended outcome to the user. Although it may be considered to improve the accuracy of the ASR itself to overcome the above problem, this approach reveals some drawbacks, it takes long time to update an ASR engine and it is difficult to reflect various pronunciation patterns of people to the speech recognition engine. That is, this method requires the developer to manipulate the speech recognition engine, which does not give a prompt help to the user who wants to use the speech recognition function of the electronic device right away. Also, the electronic device may prompt the user to assess the outcome to update the speech recognition engine. For example, the electronic device may present an outcome along with a questionnaire on a display to prompt the user to input a choice on whether the outcome coincides with the user's intention. That is, the aforementioned methods have drawbacks of requiring a developer's or user's time-consuming manipulation which may cause user inconvenience.

In accordance with an aspect of the present disclosure, an electronic device is disclosed including a microphone, at least one processor, and a memory storing programming instructions executable to: receive using the microphone a first speech signal, and extract a first natural language text from the received first speech signal, in response to detecting that extraction of the first natural language text includes errors such that a request associated with the first speech signal is unprocessable, store the extracted first natural language text, receive using the microphone a second speech signal and extract a second natural language text from the received second speech signal, in response to detecting that the request is processable using the extracted second natural language text, detect whether a similarity between the first and second natural language texts is greater than a similarity threshold, and whether the second speech signal is received within a predetermined time duration of receiving the first speech signal, and when the similarity is greater than the similarity threshold, and when the first and second speech signals are received within the predetermined time duration, store the first natural language text in association with the second natural language texts.

In accordance with another aspect of the present disclosure, a method is disclosed including receiving using a microphone a first speech signal, and extracting a first natural language text from the received first speech signal, in response to detecting by at least one processor that extraction of the first natural language text includes errors such that a request associated with the first speech signal is unprocessable, storing the extracted first natural language text, receiving using the microphone a second speech signal and extracting a second natural language text from the received second speech signal, in response to detecting that the request is processable using the extracted second natural language text, detecting whether a similarity between the first and second natural language texts is greater than a similarity threshold, and whether the second speech signal is received within a predetermined time duration of receiving the first speech signal, and when the similarity is greater than the similarity threshold, and when the first and second speech signals are received within the predetermined time duration, storing the first natural language text in association with the second natural language texts.

According to still another aspect of the present disclosure, non-transitory computer-readable medium storing programming instructions is disclosed, the programming instructions executable to receive using a microphone a first speech signal at a first time point, and extract a first natural language text from the received first speech signal, in response to detecting that extraction of the first natural language text includes errors such that a request associated with the first speech signal is unprocessable, storing the extracted first natural language text, receive using the microphone a second speech signal and extract a second natural language text from the received second speech signal, in response to detecting that the request is processable using the extracted second natural language text, detect whether a similarity between the first and second natural language texts is greater than a similarity threshold, and whether the second speech signal was received within a predetermined time duration of receiving the first speech signal, and when the similarity is greater than the similarity threshold, and when the first and second speech signals are received within the predetermined time duration, storing the first natural language text in association with the second natural language texts.

BRIEF DESCRIPTION OF THE DRAWINGS

FIG. 7A, FIG. 7B and FIG. 7C are diagrams illustrating a compensation table of the electronic device according to various embodiments of the present disclosure;

FIG. 10 is a flowchart illustrating a speech recognition function execution method of an electronic device according to various embodiments of the present disclosure.

DETAILED DESCRIPTION

Figure 1:
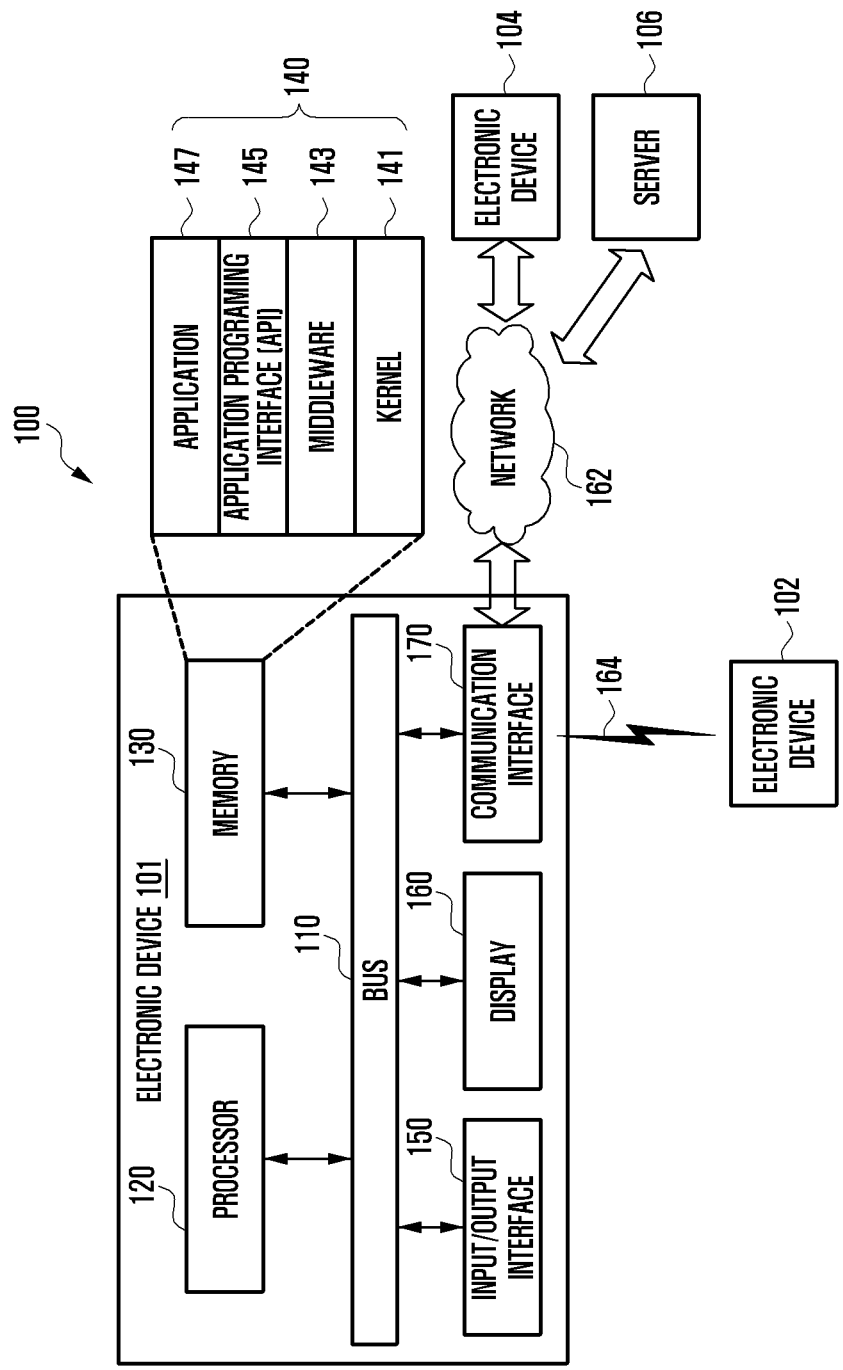
FIG. 1 is a diagram illustrating a network environment including an electronic device according to various embodiments of the present disclosure.

Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered to be limited thereto. The same reference numerals are used throughout the drawings to refer to the same or like parts.

An expression "comprising" or "may comprise" used in the present disclosure indicates presence of a corresponding function, operation, or element and does not limit an additional at least one function, operation, or element. The term "comprise" or "have" used herein indicates presence of a characteristic, numeral, step, operation, element, component, or combination thereof described in the Specification and does not exclude presence or addition of at least one other characteristic, numeral, step, operation, element, component, or combination thereof.

In the present disclosure, the term "or" includes any combination or the entire combination of together listed words. For example, "A or B" may include A, B, or A and B.

Expressions such as "a first" and "a second" in the present disclosure may represent various elements of the present disclosure, but do not limit corresponding elements, e.g., do not limit order and/or importance of corresponding elements, but may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that a first element is "coupled" to another element, such as a second element, the first element may be "directly coupled" to the second element or "electrically coupled" to the second element through a third element. However, when it is described that a first element is "directly coupled" to a second element, no third element may exist between the first and second elements.

Terms used in the present disclosure are not intended to limit the present disclosure but to illustrate embodiments of the present disclosure. When using in a description of the present disclosure and the appended claims, a singular form includes a plurality of forms unless it is explicitly differently represented.

Unless differently defined, terms including a technical term and a scientific term used herein have the same meaning as may be generally understood by a person of common skill in the art. It should be understood that generally using terms defined in a dictionary have a meaning corresponding to that of a context of related technology and are not understood to have an ideal or excessively formal meaning unless explicitly defined.

In this disclosure, an electronic device may have a communication function. For example, an electronic device may be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch.

According to some embodiments, an electronic device may be a smart home appliance that involves a communication function, such as a TV (television), a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, and Google TV™, a game console, an electronic dictionary, an electronic key, a camcorder, or an electronic picture frame.

According to some embodiments, an electronic device may be a medical device, such as MRA (magnetic resonance angiography), MRI (magnetic resonance imaging), CT (computed tomography), and ultrasonography, a navigation device, a GPS (global positioning system) receiver, an EDR (event data recorder), an FDR (flight data recorder), a car infotainment device, electronic equipment for ship, such as a marine navigation system or a gyrocompass), avionics, security equipment, or an industrial or home robot.

According to some embodiments, an electronic device may be furniture or part of a building or construction having a communication function, an electronic board, an electronic signature receiving device, a projector, or various measuring instruments, such as a water, electric, gas, or a wave meter. An electronic device disclosed herein may be one of the above-mentioned devices or any combination thereof. As well understood by those skilled in the art, the above-mentioned electronic devices are not to be considered as a limitation of the present disclosure.

According to embodiments, the electronic device may control the activation of a second sensor, based on a signal received through a first sensor, which reduces power consumption of the electronic device compared to a conventional device, in which the second sensor is activated. The electronic device according to embodiments of the present disclosure may perform a predefined function in response to the signal received through the second sensor.

FIG. 1 is a block diagram 100 illustrating an electronic apparatus according to an embodiment of the present disclosure.

Referring to FIG. 1, the electronic device 101 may include a bus 110, a processor 120, a memory 130, a user input module (i.e., input/output interface) 150, a display 160, and a communication interface 170.

The bus 110 may be a circuit for interconnecting elements of the electronic device 101 and for allowing a communication, such as by transferring a control message, between the elements.

The processor 120 can receive one or more instructions from the memory 130, the input/output interface (e.g., including a user input module) 150, the display 160, and the communication interface 170, through the bus 110, can decipher the received one or more instructions, and perform operations and/or data processing according to the deciphered one or more instructions.

The memory 130 can store one or more instructions received from the processor 120 and/or other elements, and/or one or more instructions and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of at least two thereof.

The kernel 141 can control and/or manage system resources used for execution of operations and/or functions implemented in other programming modules, such as the middleware 143, the API 145, and/or the applications 147, and can provide an interface through which the middleware 143, the API 145, and/or the applications 147 can access and then control and/or manage an individual element of the electronic apparatus (or device, as indicated in FIG. 1) 101.

The middleware 143 can perform a relay function which allows the API 145 and/or the applications 147 to communicate with and exchange data with the kernel 141. In relation to operation requests received from at least one of applications 147, the middleware 143 can perform load balancing in relation to the operation requests by giving a priority in using a system resource, e.g. the bus 110, the processor 120, and/or the memory 130, of the electronic apparatus 101 to at least one application from among the at least one of the applications 147.

The API 145 is an interface through which the applications 147 can control a function provided by the kernel 141 and/or the middleware 143, and may include at least one interface or function for file control, window control, image processing, and/or character control.

The input/output interface (e.g., including a user input module) 150 may receive a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 164, and can support short range communication protocols, e.g. a wireless fidelity (WiFi) protocol, a BlueTooth (BT) protocol, and a near field communication (NFC) protocol, communication networks, e.g. Internet, local area network (LAN), wide area network (WAN), a telecommunication network, a cellular network, and a satellite network, a plain old telephone service (POTS), or any other similar and/or suitable communication networks, such as network 162. Each of the electronic devices 102 and 104 may be the same type or different types of electronic devices.

Figure 2:
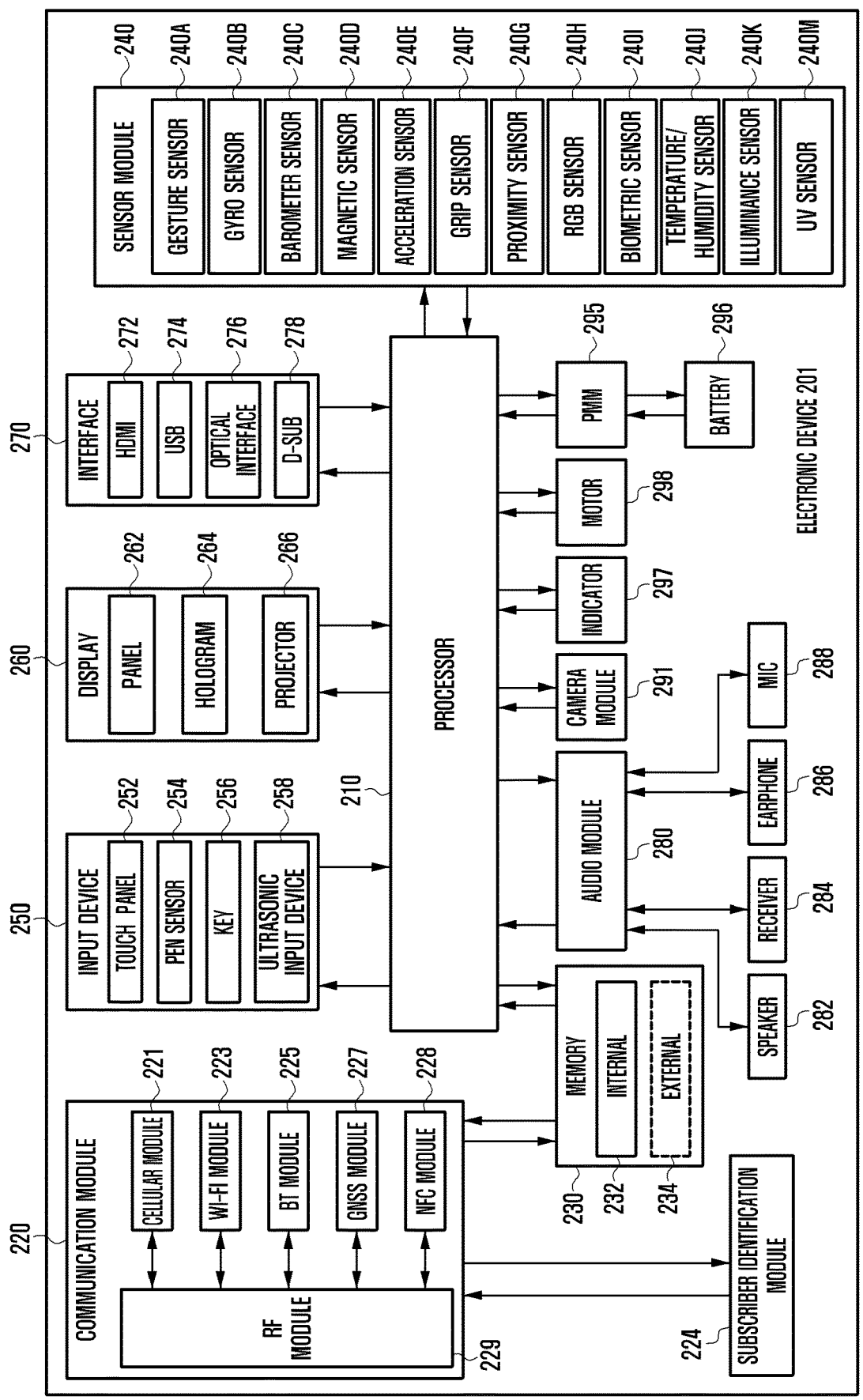
FIG. 2 is a block diagram illustrating an electronic device according to various embodiments of the present disclosure.

FIG. 2 illustrates an electronic device 201 in accordance with an embodiment of the present disclosure. The electronic device 201 may form all or part of the electronic device 101 shown in FIG. 1.

Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), and may further include a graphic processing unit (GPU).

The communication module 220 may perform a data communication with any other electronic device connected to the electronic device 201 through the network. According to an embodiment, the communication module 220 may include therein a cellular module 221, a WiFi module 223, a BT module 225, a GPS module 227, an NFC module 228, and an RF (radio frequency) module 229.

The cellular module 221 may offer a voice call, a video call, a message service, or an Internet service through a communication network, such as long term evolution (LTE), LTE-advanced (LTE-A), code division multiple access (CDMA), wideband CDMA (WCDMA), universal mobile telecommunications system (UMTS), WiBro, or global system for mobile communication (GSM). Additionally, the cellular module 221 may perform identification and authentication of the electronic device in the communication network, using the SIM card 224. According to an embodiment, the cellular module 221 may perform at least part of functions the AP 210 can provide, such as a multimedia control function.

According to an embodiment, the cellular module 221 may include a communication processor (CP), and may be formed of an SoC, for example. Although some elements such as the cellular module 221, such as the CP, the memory 230, or the power management module 295 are shown as separate elements being different from the AP 210 in FIG. 2, the AP 210 may be formed to have at least part of the above elements in an embodiment of the present disclosure.

According to an embodiment, the AP 210 or the cellular module 221 may load one or more instructions or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received there-through. Although FIG. 2 illustrates the cellular module 221, the WiFi module 223, the BT module 225, the GPS module 227 and the NFC module 228 as different blocks, at least two of these modules may be contained in a single IC (integrated circuit) chip or a single IC package, i.e., may be formed as a single SoC.

The RF module 229 may transmit and receive RF signals or any other electric signals, and may include a transceiver, a PAM (power amp module), a frequency filter, or an LNA (low noise amplifier). The RF module 229 may further include any component, e.g., a wire or a conductor, for transmission of electromagnetic waves in a free air space. Although FIG. 2 illustrates that the cellular module 221, the WiFi module 223, the BT module 225, the GPS module 227 and the NFC module 228 share the RF module 229, at least one of these modules may perform transmission and reception of RF signals through a separate RF module in an embodiment of the present disclosure.

The SIM card 224 may be a specific card formed of SIM and may be inserted into a slot formed at a certain location of the electronic device. The SIM card 224 may contain therein an ICCID (integrated circuit card identifier) or an IMSI (international mobile subscriber identity).

The memory 230 may include an internal memory 232 and an external memory 234. The internal memory 232 may include at least one of a volatile memory, such as DRAM (dynamic random access memory), SRAM (static RAM), SDRAM (synchronous DRAM), or a nonvolatile memory, such as OTPROM (one time programmable read-only memory), PROM (programmable ROM), EPROM (erasable and programmable ROM), EEPROM (electrically erasable and programmable ROM), mask ROM, flash ROM, NAND flash memory, and NOR flash memory.

According to an embodiment, the internal memory 232 may have the form of an SSD (solid state drive). The external memory 234 may include a flash drive, e.g., CF (compact flash), SD (secure digital), Micro-SD (micro secure digital), Mini-SD (mini secure digital), xD (extreme digital), or memory stick, and may be functionally connected to the electronic device 201 through various interfaces. The electronic device 201 may further include a storage device or medium such as a hard drive.

The sensor module 240 may measure physical quantity or sense an operating status of the electronic device 201, and then convert measured or sensed information into electric signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as an RGB (red, green, blue) sensor, a biometric sensor 240I, a temperature-humidity sensor 240J, an illumination sensor 240K, and a UV (ultraviolet) sensor 240M. Additionally or alternatively, the sensor module 240 may include an E-nose sensor, an EMG (electromyography) sensor, an EEG (electroencephalogram) sensor, an ECG (electrocardiogram) sensor, an IR (infrared) sensor, an iris scan sensor, or a finger scan sensor. The sensor module 240 may include a control circuit for controlling one or more sensors equipped therein.

The input unit 250 may include a touch panel 252, a digital pen sensor 254, a key 256, or an ultrasonic input device 258. The touch panel 252 may recognize a touch input in a capacitive, resistive, infrared, or ultrasonic type manner. The touch panel 252 may further include a control circuit. In case of a capacitive type, a physical contact or proximity may be recognized. The touch panel 252 may further include a tactile layer that offers a tactile feedback to a user.

The digital pen sensor 254 may be formed in the same or similar manner as receiving a touch input or by using a separate recognition sheet. The key 256 may include a physical button, an optical key, or a keypad. The ultrasonic input device 258 is capable of identifying data by sensing sound waves with a microphone (MIC) 288 in the electronic device 201 through an input tool that generates ultrasonic signals, thus allowing wireless recognition. According to an embodiment, the electronic device 201 may receive a user input from any external device connected thereto through the communication module 220.

The display 260 may include a panel 262, a hologram device 264, or a projector 266. The panel 262 may be LCD (liquid crystal display), or AM-OLED (active matrix organic light emitting diode) may have a flexible, transparent or wearable form, and may be formed of a single module with the touch panel 252. The hologram device 264 may project a stereoscopic image in the air using interference of light. The projector 266 may project an image onto a screen, which may be located at the inside or outside of the electronic device 201. According to an embodiment, the display 260 may further include a control circuit for controlling the panel 262, the hologram device 264, and the projector 266.

The interface 270 may include an HDMI (high-definition multimedia interface) 272, a USB (universal serial bus) 274, an optical interface 276, and a D-sub (d-subminiature) 278, and may be contained in the communication interface 170 shown in FIG. 1. Additionally or alternatively, the interface 270 may include an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained in the input/output interface 150 shown in FIG. 1. The audio module 280 may process sound information inputted or outputted through a speaker 282, a receiver 284, an earphone 286, or the MIC 288.

The camera module 291 is capable of obtaining still images and moving images, and may include at least one image sensor, such as a front sensor or a rear sensor, a lens, an ISP (image signal processor), or a flash, such as LED or xenon lamp.

The power management module 295 may manage electric power of the electronic device 201 and may include a PMIC (power management integrated circuit), a charger IC, or a battery gauge.

The PMIC may be formed of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include a magnetic resonance type, a magnetic induction type, or an electromagnetic type. Any additional circuit for a wireless charging may be further used, such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be a rechargeable or solar battery.

The indicator 297 may illustrate thereon a current status, such as a booting, message, or recharging status of part or all of the electronic device 201. The motor 298 may convert an electric signal into a mechanical vibration. The electronic device 201 may include a specific processor, such as GPU, for supporting a mobile TV. This processor may process media data that comply with standards of DMB (digital multimedia broadcasting), DVB (digital video broadcasting), or media flow.

Each of the above-discussed elements of the electronic device disclosed herein may be formed of one or more components, and may have various names according to the type of the electronic device. The electronic device disclosed herein may be formed of at least one of the above-discussed elements without some elements or with additional elements. Some of the elements may be integrated into a single entity that still performs the same functions as those of such elements before integrated.

Figure 3:
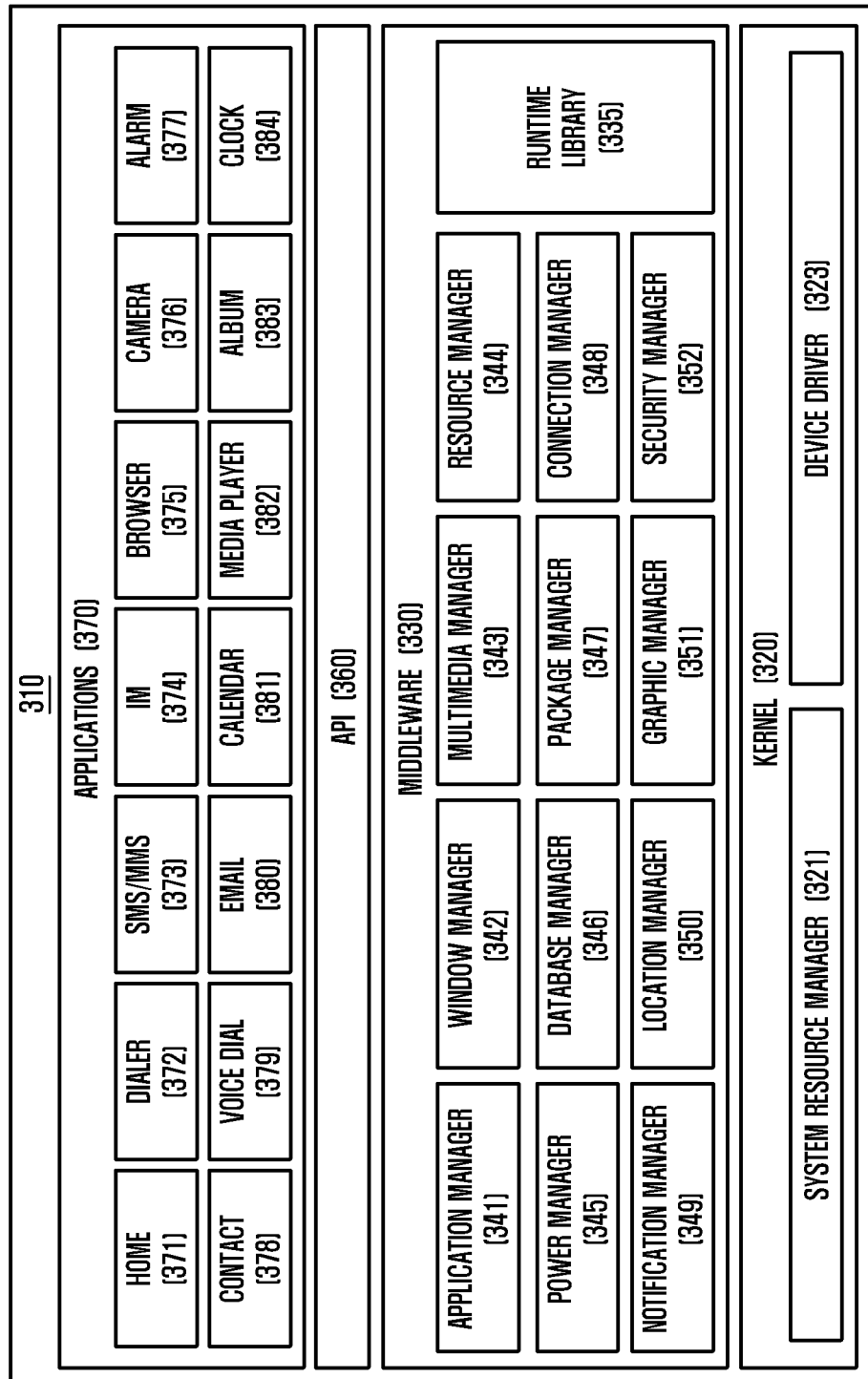
FIG. 3 is a block diagram illustrating a program module according to various embodiments of the present disclosure.

FIG. 3 illustrates a configuration of a programming module 310 according to an embodiment of the present disclosure.

The programming module 310 may be stored in the electronic apparatus (or device) 101 or may be stored in the electronic device 201 illustrated in FIG. 2. At least a part of the programming module 310 may be implemented in software, firmware, hardware, or a combination of two or more thereof. The programming module 310 may be implemented in hardware 201, and may include an OS controlling resources related to an electronic device and/or various applications 370 executed in the OS. For example, the OS may be Android, iOS, Windows, Symbian, Tizen, or Bada.

Referring to FIG. 3, the programming module 310 may include a kernel 320, middleware 330, an API 360, and/or applications 370.

The kernel 320 may include a system resource manager 321 and/or a device driver 323. The system resource manager 321 may include a process manager, a memory manager, and a file system manager. The system resource manager 321 may perform the control, allocation, or recovery of system resources. The device driver 323 may include a display driver, a camera driver, a Bluetooth driver, a shared memory driver, a USB driver, a keypad driver, a Wi-Fi driver, and/or an audio driver, and may further include an inter-process communication (IPC) driver.

The middleware 330 may include multiple modules previously implemented so as to provide a function used in common by the applications 370, and may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the applications 370, and may perform functions which are related to input and output, the management of a memory, or an arithmetic function.

The application manager 341 may manage a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, or a storage space, of at least one of the applications 370.

The power manager 345 may operate together with a basic input/output system (BIOS), may manage a battery or power, and may provide power information used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as Wi-Fi and Bluetooth. The notification manager 349 may display or report, to the user, an event such as an arrival message, an appointment, or a proximity alarm, in such a manner as not to disturb the user. The location manager 350 may manage location information of the electronic device. The graphics manager 351 may manage graphic effects, which are to be provided to the user, and/or a user interface related to the graphic effects. The security manager 352 may provide various security functions used for system security and user authentication. According to an embodiment of the present disclosure, when the electronic device has a telephone function, the middleware 330 may further include a telephony manager for managing a voice and/or video telephony call function of the electronic device.

The middleware 330 may generate and use new middleware module through various functional combinations of the above-described internal element modules, may provide modules specialized according to types of OSs in order to provide differentiated functions, and may dynamically delete some of the existing elements, or may add new elements.

Accordingly, the middleware 330 may omit some of the elements described in the embodiments of the present disclosure, may further include other elements, or may replace the some of the elements with elements, each of which performing a similar function and having a different name.

The API 360 is a set of API programming functions, and may be provided with a different configuration according to an OS. In the case of Android or iOS, for example, one API set may be provided to each platform. In the case of Tizen, two or more API sets may be provided to each platform.

The applications 370 may include a preloaded application and/or a third party application, and may include a home 371, dialer 372, a short message service (SMS)/multimedia messaging service (MMS) 373, instant message (IM) 374, browser 375, camera 376, alarm 377, contact 378, voice dial 379, electronic mail (e-mail) 380, calendar 381, media player 382, album 383, and clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be the memory 230. At least a part of the programming module 310 may be executed by the one or more processors 210, and may include a module, a program, a routine, a set of instructions, and/or a process for performing one or more functions.

Figure 4:
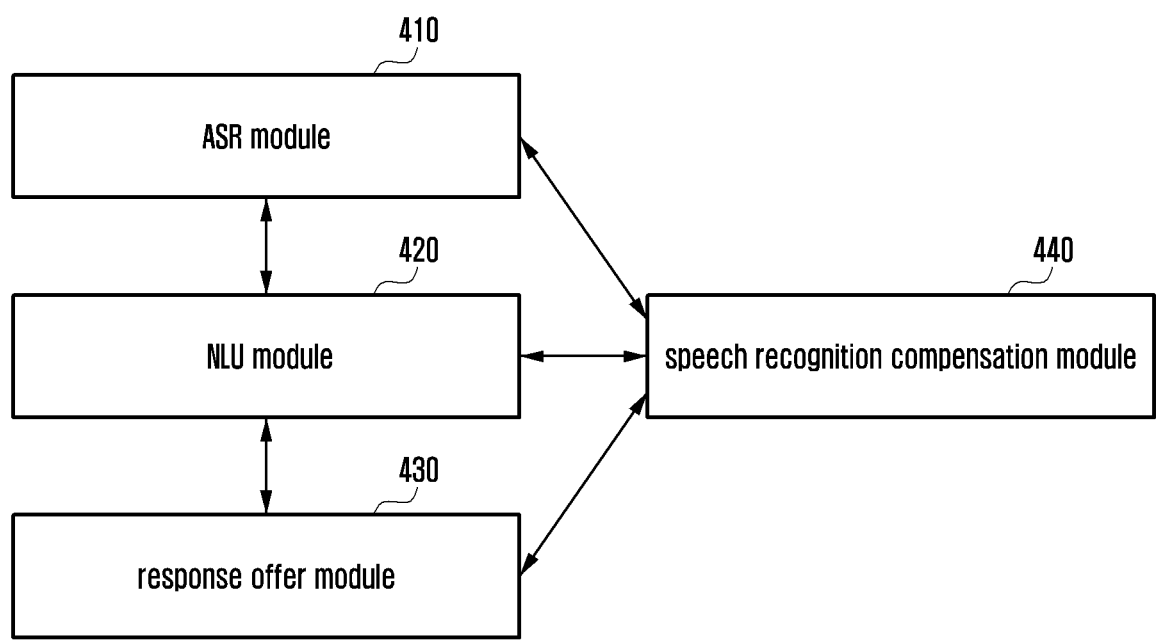
FIG. 4 is a schematic diagram illustrating a speech recognition system of an electronic device according to various embodiments of the present disclosure.

FIG. 4 is a schematic diagram illustrating a speech recognition system of an electronic device according to various embodiments of the present disclosure.

In the embodiment of FIG. 4, the speech recognition system of the electronic device 101 may include an ASR module 410, an NLU module 420, a response offer module 430, and a speech recognition compensation module 440.

According to various embodiments of the present disclosure, the electronic device 101 may receive a speech signal from a user by means of the speech recognition system, converts the received speech signal to a word or a sentence, and provide a user with a function corresponding to the word or sentence. For example, the electronic device 101 may receive an input signal conveying a speech "What time is it now" and analyzes the speech conveyed in the input signal to output the current time in speech to the user.

According to various embodiments of the present disclosure, the electronic device 101 may convert the speech signal input by the user to a natural language. For example, the ASR module 410 may convert the input speech signal to a natural language by means of a speech recognition engine installed in the electronic device 101 or the external server 106. The present disclosure aims to provide a method for compensating for a situation where it is difficult to understand the meaning of the natural language, which results from inaccuracy of the natural language converted by the speech recognition engine, rather than a method for improving the accuracy of the natural language converted by the speech recognition engine.

According to various embodiments of the present disclosure, the electronic device 101 may analyze the meaning of the natural language converted by the ASR module 410 with the assistance of the NLU module 420. For example, the NLU module 420 may analyze the converted natural language to determine whether the natural language is meaningful and send the analysis result to the response offer module 430. If the converted natural language is intended to ask for the present time, the NLU module 420 may notify the response offer module 430 that the user is asking for the current time. If it is impossible to understand the meaning of the converted natural language, the NLU module 420 may request for reinitiating the process for receiving the user's speech input.

According to various embodiments of the present disclosure, the electronic device 101 may produce a response, by means of the response offer module 430, in reply to the natural language verified as meaningful by the NLU module 420. For example, the response offer module 430 may make an enquiry to the electronic device 101 or the external server 106 based on the meaning of the natural language that is received from the NLU module 420. The response offer module 430 may provide a response, which is generated based on the enquiry result received from the electronic device 101 or the external server 106, to the user in reply to the speech made by the user.

According to various embodiments of the present disclosure, the electronic device 101 may include the speech recognition compensation module 440. Further including the speech recognition compensation module 440 in addition to the ASR module 410, the NLU module 420, and the response offer module 430, the electronic device 101 may provide the speech recognition function more promptly and conveniently.

According to various embodiments of the present disclosure, the electronic device 101 may generate a compensation table by means of the speech recognition compensation module 440. For example, the compensation table may store a recognized sentence, an occurrence time, a response offer sentence, etc. Here, the recognized sentence may mean a natural language sentence obtained by converting a speech made by the user. The occurrence time may mean the time when the user has made the speech. The response offer sentence may mean a sentence similar to the recognized sentence selected among the comprehensible sentences of the natural language sentences obtained by converting the speech made by the user. That is, the electronic device 101 may determine a response offer sentence in consideration of at least one of a similarity to the recognized sentence and occurrence time.

According to various embodiments of the present disclosure, if a speech input made in a predetermined time (e.g., relatively short time period of 30 seconds or 1 minute) since a speech recognition failure is recognized successfully as a natural language sentence (e.g., second sentence), the electronic device 101 may determine whether the successfully recognized natural language sentence (e.g., second sentence) is similar to a recognition-failed natural language sentence (e.g., first sentence). For example, the electronic device 101 may refer to a character string comparison result and pronunciation similarity (e.g., a comparison of an estimated pronunciation of each of the first sentence and second sentence, as extracted into text) to determine the similarity between two natural language sentences. If the similarity is equal to or greater than a predetermined percentage (e.g., 80%), the electronic device 101 may determine that the speech recognition-failed natural language sentence (e.g., first sentence) and the speech recognition-succeeded natural language sentence (e.g., second sentence) are similar to each other.

According to various embodiments of the present disclosure, if it is determined that the speech recognition-failed natural language sentence (e.g., first sentence) and the speech recognition-succeeded natural language sentence (e.g., second sentence) are similar to each other, the electronic device 101 may create, write, or store a compensation table such that the speech recognition-failed natural language sentence (e.g., first sentence recognized as above) is mapped to the speech recognition-succeeded natural language sentence (e.g., second sentence). That is, if similar natural language sentences are repetitively input during a relatively short time period, the electronic device 101 may determine that the recognition-failed natural language sentence input previously intends to the recognition-succeeded natural language sentence input later.

According to various embodiments of the present disclosure, although the ASR module 410 fails recognizing the speech made by the user, the electronic device 101 may facilitate providing the user with the speech recognition function as intended by the user. As a consequence, the present disclosure is capable of reducing the user's inconvenience caused the requirement of repetitive speech input until acquiring satisfactory speech recognition result value.

The present disclosure is described hereinafter by embodiments illustrated with reference to FIGS. 5, 6, 7A to 7C, and 8.

Figure 5:
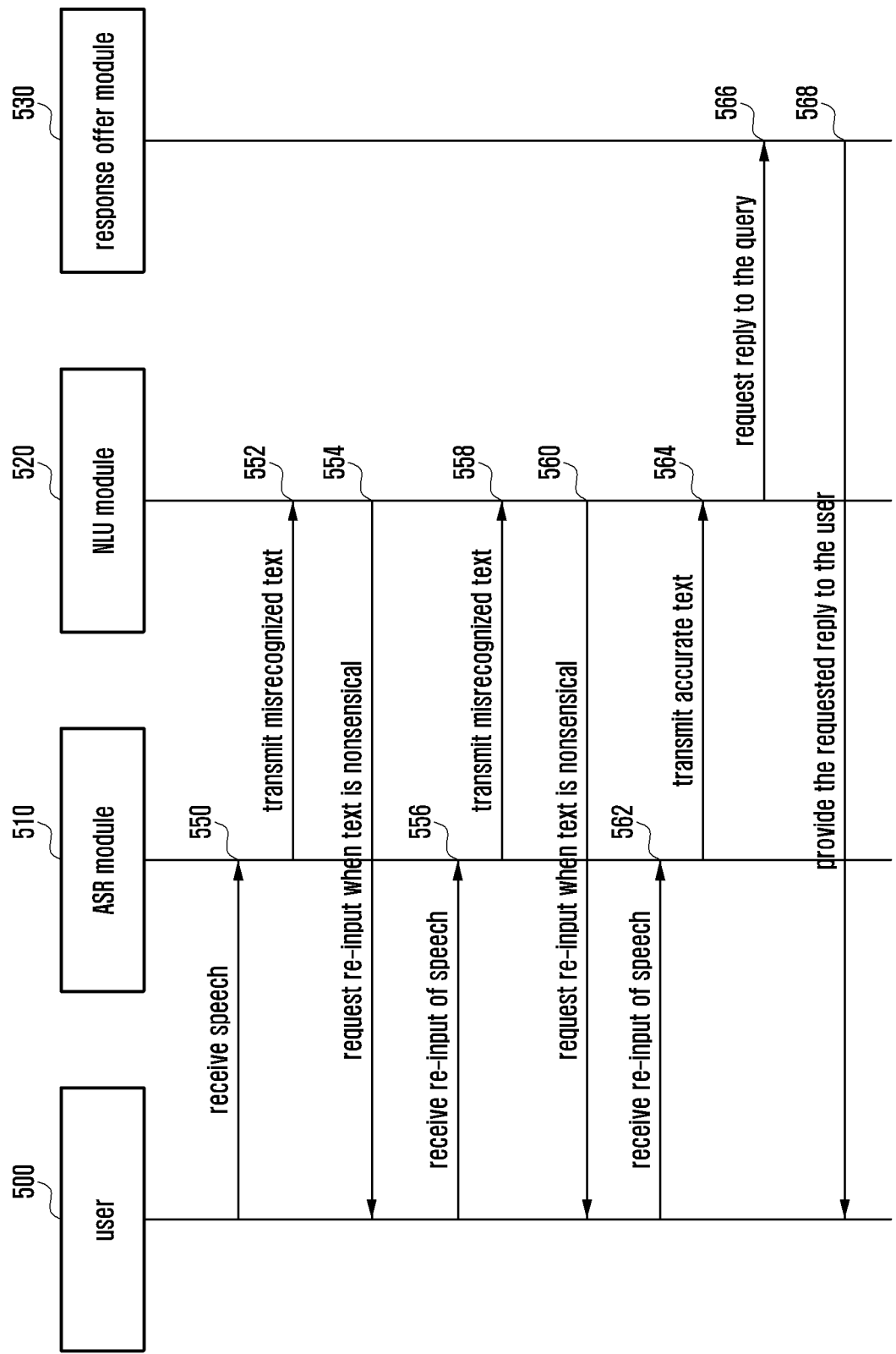
FIG. 5 is a signal flow diagram illustrating a speech recognition function execution method before a compensation table is generated in an electronic device according to various embodiments of the present disclosure.

FIG. 5 is a signal flow diagram illustrating a speech recognition function execution method before a compensation table is generated in an electronic device according to various embodiments of the present disclosure.

In reference to FIG. 5, the electronic device 101 may execute the speech recognition function by means of an ASR module 510 (ASR module 410 in FIG. 4), an NLU module 520 (NLU module 420 in FIG. 4), and a response offer module 530 (response offer module 430 in FIG. 4) according to various embodiments of the present disclosure.

According to various embodiments of the present disclosure, the electronic device 101 may receive a speech signal input by a user 500 at step 550. For example, the user may make a speech input like "What time is it?" to ask for the present time.

According to various embodiments of the present disclosure, the electronic device 101 (ASR module 510) may misrecognize the speech signal input by the user. For example, the electronic device 101 may convert the speech "What time is it?" intended by means of the speech signal to "What time is eat?". According to various embodiments of the present disclosure, the electronic device 101 may send the converted natural language (i.e., "What time is eat?") to the NLU module 520 at step 552.

According to various embodiments of the present disclosure, the electronic device 101 (NLU module 520) may analyze the natural language received from the ASR module 510 to find its meaning. For example, the electronic device 101 may analyze the natural language to suggest "What time is eat?" and determine that the natural language is meaningless. According to various embodiments of the present disclosure, if it is determined that the natural language is meaningless, the electronic device 101 may prompt the user, at step 554, to make a speech input again. For example, if the electronic device 101 cannot process the natural language-based user's request, it may determine the natural language is meaningless. Since the text like "What time is eat?" cannot be analyzed grammatically, the electronic device 101 may not properly understand the user's request. Accordingly, the electronic device 101 cannot process the user's request conveyed in the input speech signal and thus may ask the user to make a speech input again. For example, the electronic device 101 may ask the user to make a speech input again when it cannot understand the meaning of the analyzed natural language and when it cannot process the user's request.

According to various embodiments of the present disclosure, the electronic device 101 may receive a speech signal that is secondly input by the user 500 at step 556. For example, the user may speak the sentence "What time is it?" slowly to ask for the present time.

According to various embodiments of the present disclosure, the electronic device 101 (ASR module 510) may misrecognize the speech signal input by the user 500 again. For example, the electronic device 101 may convert the speech "What time is it?" intended by means of the speech signal to "What time is eat?". According to various embodiments of the present disclosure, the electronic device 101 may send the converted natural language (i.e., "What time is eat?") to the NLU module 520 at step 558.

According to various embodiments of the present disclosure, the electronic device 101 (NLU module 520) may analyze the natural language received from the ASR module 510 to find its meaning. For example, the electronic device 101 may analyze the natural language to suggest "What time is eat?" and determine that the natural language is meaningless. According to various embodiments of the present disclosure, if it is determined that the natural language is meaningless, the electronic device 101 may prompt, at step 560, the user to make a speech input again. For example, if the electronic device 101 cannot process the natural language-based user's request, it may determine the natural language is meaningless. Since the text like "What time is eat?" cannot be analyzed grammatically, the electronic device 101 may not properly understand the user's request. Accordingly, the electronic device 101 cannot process the user's request conveyed in the input speech signal and thus may ask the user to make a speech input again. For example, the electronic device 101 may ask the user to make a speech input again when it cannot understand the meaning of the analyzed natural language and when it cannot process the user's request.

According to various embodiments of the present disclosure, the electronic device 101 may receive a speech signal that is thirdly input by the user 500 at step 562. For example, the user may speak the sentence like "What time is it?" very articulately to ask for the present time.

According to various embodiments of the present disclosure, the electronic device 101 (ASR module 510) may correctly recognize the speech signal input by the user 500. For example, the electronic device 101 may convert the speech "What time is it?" intended by means of the speech signal to "What time is it?". According to various embodiments of the present disclosure, the electronic device 101 may send the converted natural language (i.e., "What time is it?") to the NLU module 520 at step 564.

According to various embodiments of the present disclosure, the electronic device 101 (NLU module 520) may analyze the natural language received from the ASR module 510 to find its meaning. For example, the electronic device 101 may analyze the natural language to find the meaning of "What time is it?" intending to ask for the present time. According to various embodiments of the present disclosure, if it is determined that the natural language is meaningful, then in operation 566, the electronic device 101 may request to the response offer module 530 for providing a response formulated as a reply to the query. Subsequently, in operation 568, the response offer module 530 may provide the reply to the user. For example, if the electronic device 101 is capable of processing the natural language-based user's request, it may determine that the natural language is meaningful. Since the text like "What time is it?" can be analyzed grammatically, the electronic device 101 may properly understand the user's request. For example, the electronic device 101 may not ask the user to make a speech input again when it can understand the meaning of the analyzed natural language and when it can process the user's request.

In reference to FIG. 5, the electronic device 101 may present the correctly processed result to the user specifically when the ASR module 510 converts the speech signal input by the user to a natural language intended by the user. In order to enhance the performance of the method of the embodiment of FIG. 5, the electronic device 101 may further include a speech recognition compensation module (speech recognition compensation module 440 in FIG. 4) in the embodiments of FIGS. 6, 7A to 7C, and 8.

Figure 6:
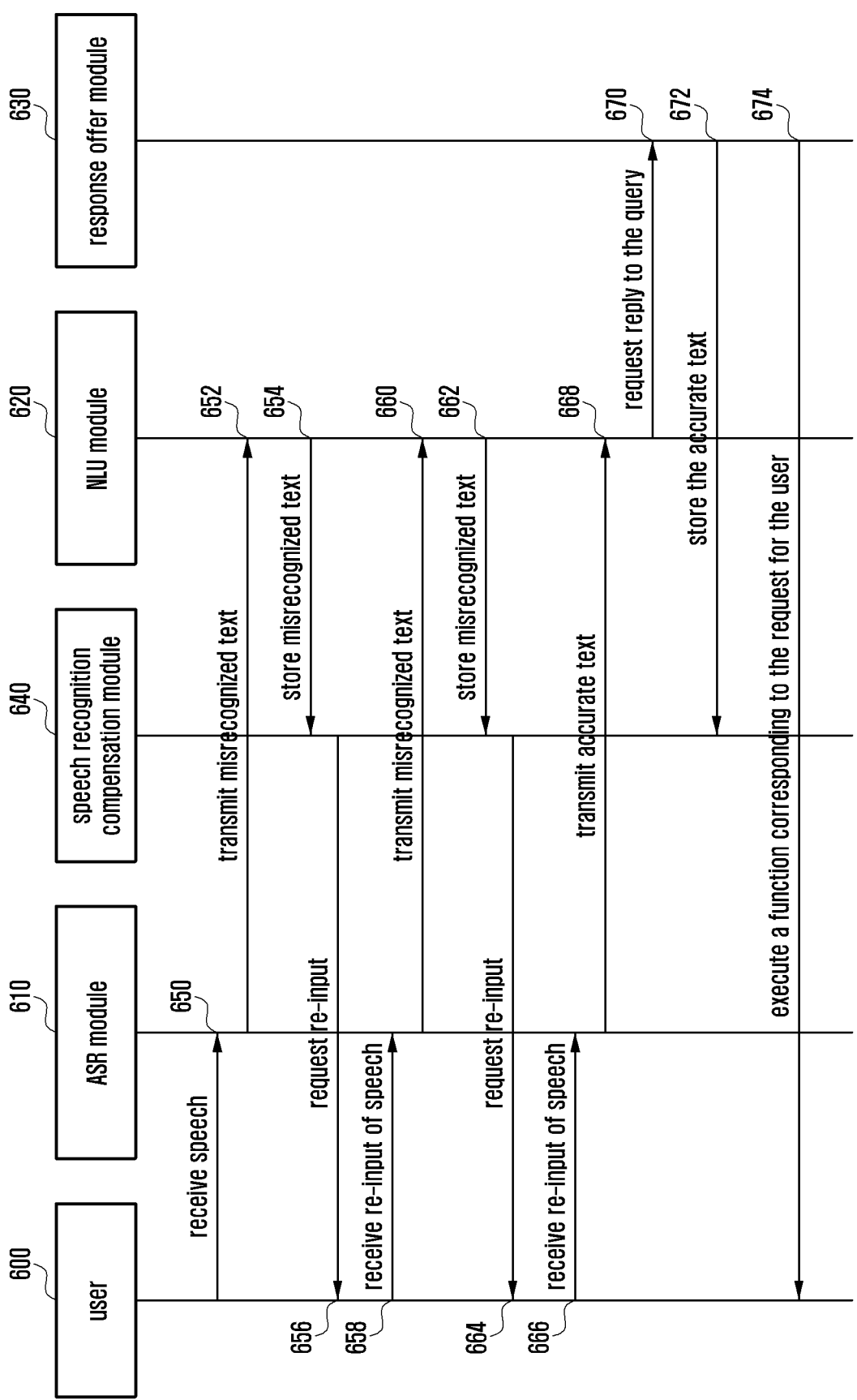
FIG. 6 is a signal flow diagram illustrating a speech recognition function execution method after a compensation table is generated in an electronic device according to various embodiments of the present disclosure.

FIG. 6 is a signal flow diagram illustrating a speech recognition function execution method after a compensation table is generated in an electronic device according to various embodiments of the present disclosure.

In reference to FIG. 6, the electronic device 101 may execute the speech recognition function by means of an ASR module 610 (ASR module 410 in FIG. 4), an NLU module 620 (NLU module 420 in FIG. 4), a response offer module 630 (response offer module 430 in FIG. 4), and a speech recognition compensation module 640 (speech recognition compensation module 640 in FIG. 4).

According to various embodiments of the present disclosure, the electronic device 101 may receive a speech signal input by a user 600 at step 650. For example, the user may make a speech input like "What time is it?" to ask for the present time.

According to various embodiments of the present disclosure, the electronic device 101 (ASR module 610) may misrecognize the speech signal input by the user. For example, the electronic device 101 may convert the speech "What time is it?" intended by means of the speech signal to "What time is eat?". According to various embodiments of the present disclosure, the electronic device 101 may send the converted natural language (i.e., "What time is eat?") to the NLU module 620 at step 652.

According to various embodiments of the present disclosure, the electronic device 101 (NLU module 620) may analyze the natural language received from the ASR module 610 to find its meaning. For example, the electronic device 101 may analyze the natural language to suggest "What time is eat?" and determine that the natural language is meaningless.

According to various embodiments of the present disclosure, the electronic device 101 (speech recognition compensation module 640) may store the natural language determined meaningless as a record (e.g., recognized sentence and occurrence time) in the compensation table at step 654. According to various embodiments of the present disclosure, if it is determined that the natural language is meaningless, the electronic device 101 may prompt the user, at step 656, to make a speech input again. Here, the order of steps 654 and 656 does not affect the technical idea of the present disclosure and thus can be changed by those skilled in the art.

According to various embodiments of the present disclosure, the electronic device 101 may receive a speech signal that is secondly input by the user 600 at step 658. For example, the user may speak the sentence "What time is it?" slowly to ask for the present time.

According to various embodiments of the present disclosure, the electronic device 101 (ASR module 610) may misrecognize the speech signal input by the user 600 again. For example, the electronic device 101 may convert the speech "What time is it?" intended by means of the speech signal to "What time is eat?". According to various embodiments of the present disclosure, the electronic device 101 may send the converted natural language (i.e., "What time is eat?") to the NLU module 620 at step 660.

According to various embodiments of the present disclosure, the electronic device 101 (NLU module 620) may analyze the natural language received from the ASR module 610 to find its meaning. For example, the electronic device 101 may analyze the natural language to suggest "What time is eat?" and determine that the natural language is meaningless.

According to various embodiments of the present disclosure, the electronic device 101 (speech recognition compensation module 640) may store the natural language determined meaningless as a record (e.g., recognized sentence and occurrence time) in the compensation table at step 662. According to various embodiments of the present disclosure, if it is determined that the natural language is meaningless, the electronic device 101 may prompt, at step 664, the user to make a speech input again. Here, the order of steps 662 and 664 does not affect the technical idea of the present disclosure and thus can be changed by those skilled in the art.

According to various embodiments of the present disclosure, the electronic device 101 may receive a speech signal that is thirdly input by the user 600 at step 666. For example, the user may speak the sentence like "What time is it?" very articulately to ask for the present time.

According to various embodiments of the present disclosure, the electronic device 101 (ASR module 610) may correctly recognize the speech signal input by the user 600. For example, the electronic device 101 may convert the speech "What time is it?" intended by means of the speech signal to "What time is it?". According to various embodiments of the present disclosure, the electronic device 101 may send the converted natural language (i.e., "What time is it?") to the NLU module 620 at step 668.

According to various embodiments of the present disclosure, the electronic device 101 (NLU module 620) may analyze the natural language received from the ASR module 610 to find its meaning. For example, the electronic device 101 may analyze the natural language to find the meaning of "What time is it?" intending to ask for the present time. According to various embodiments of the present disclosure, if it is determined that the natural language is meaningful, then in operation 670, the electronic device 101 may request to the response offer module 630 for providing a response in reply to the query.

According to various embodiments of the present disclosure, the electronic device 101 (speech recognition compensation module 640) may store the natural language determined meaningful and thus responded as a record (e.g., responded sentence and successfully recognized sentence) in the compensation table at step 672.

According to various embodiments of the present disclosure, the electronic device 101 (response offer module 630) may execute, at step 674, a function corresponding to the speech signal in response to the user's request. Here, the order of steps 672 and 674 does not affect the technical idea of the present disclosure and thus can be changed by those skilled in the art.

In reference to FIG. 6, the electronic device 101 may create the compensation table by means of the speech recognition compensation module 640 and compensate for speech recognition errors occurring afterward using the compensation table. The compensation table-based speech recognition error compensation method may be described in more detail later with reference to FIG. 8.

FIGS. 7A to 7C are diagrams illustrating a compensation table of the electronic device according to various embodiments of the present disclosure.

In reference to FIG. 7A, the electronic device 101 (speech recognition compensation module 440) may store recognition-failed sentences in a compensation table 700 according to various embodiments of the present disclosure. For example, the electronic device 101 may store a sentence 710 that the electronic device 101 has failed to recognize as a 'recognized sentence (or natural language)' or 'speech recognition-failed sentence (or natural language)' record 705 in the compensation table 700. The electronic device may store the record of the speech-recognition-failed sentence in the compensation table, the record including a field named 'occurrence time' or 'recognition time' 715 indicating the time 720 when the speech recognition-failed sentence has been input. A further response offer sentence record 725 may store a reply generated in response to the recognized sentence 710. Since in this example the recognized sentence 710 is nonsensical, an empty record 730 may be provided for the response offer sentence record 725.

The electronic device 101 may generate the compensation table 700 as shown in FIG. 7A as a result of the operation at step 654 of FIG. 6. The electronic device 101 may also generate the compensation table 700 as shown in FIG. 7B as a result of the operation at step 662 of FIG. 6. For example, if the electronic device 101 (NLU module 420) misrecognizes the speech input as "What time is eat?" 710 and "What time is in?" 711, it may store the misrecognized sentences "What time is eat?" 710 and "What time is in?" 721 as individual records with occurrence times 720 and 721.

According to various embodiments of the present disclosure, the electronic device 101 (speech recognition compensation module 440) may generate the compensation table 700 as shown in FIG. 7C as a result of the operation at step 672 of FIG. 6. For example, the electronic device 101 (speech recognition compensation module 440) succeeds in speech recognition in a predetermined time after speech recognition failure, it may analyze a similarity between a speech recognition-failed sentence stored in the compensation table and the speech recognition-succeeded sentence. For example, if it is determined that the similarity is equal to or greater than a predetermined percentage (e.g., 80%), the electronic device 101 may determine that speech recognition-failed sentences 710 and 711 stored in the compensation table 700 and the speech recognition-succeeded sentence 730 and 731 are similar to each other.

According to various embodiments of the present disclosure, if it is determined that the speech recognition-failed sentence stored in the compensation table and the speech recognition-succeeded sentence are similar to each other, the electronic device 101 may store the speech recognition-succeeded sentence 730 and 731 in a field named 'response offer sentence' or 'speech recognition-succeeded sentence' 725 as a match of a field named 'recognized sentence' of the record of the corresponding speech recognition-failed sentence. For example, the electronic device 101 may analyze the similarity of the speech input "What time is it?" made at the time of 05:28:40 720 as a result of the operation at step 666 of FIG. 6 with the misrecognized sentences "What time is eat?" 710 and "What time is in?" 711. The electronic device 101 may perform character string comparison and pronunciation similarity analysis on the above sentences to determine the similarity therebetween. The electronic device 101 may store the sentence "What time is it?" 730 and 731 in the 'response offer sentence' field 725 of the record of each of the misrecognized sentences "What time is eat?" 710 and "What time is in?" 711. Afterward, although the speech input made by the user under the intention of "What time is it?" is misrecognized or converted to "What time is eat?" 710 or "What time is in?" 711, the electronic device 101 may interpret the speech input as "What time is it?" 730 and 731 by referencing the compensation table 700 and correctly replying to the user's query with the present time.

Figure 8:
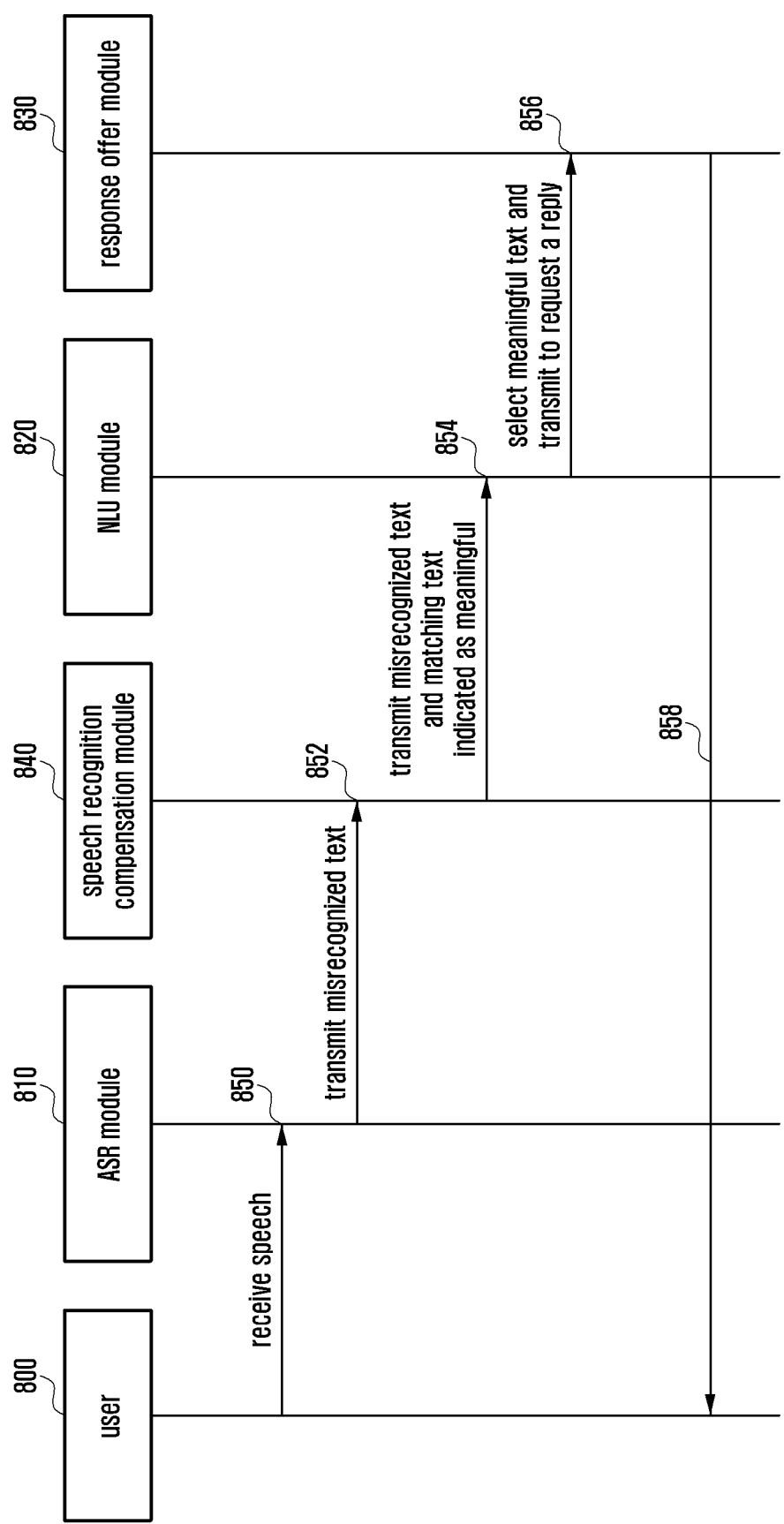
FIG. 8 is a signal flow diagram illustrating a compensation table-based speech recognition function execution method of an electronic device according to various embodiments of the present disclosure.

FIG. 8 is a signal flow diagram illustrating a compensation table-based speech recognition function execution method of an electronic device according to various embodiments of the present disclosure.

In reference to FIG. 8, the electronic device 101 may execute the speech recognition function by means of an ASR module 810 (ASR module 410 in FIG. 4), an NLU module 820 (NLU module 420 in FIG. 4), a response offer module 830 (response offer module 430 in FIG. 4), and a speech recognition compensation module 840 (speech recognition compensation module 440 in FIG. 4) according to various embodiments of the present disclosure.

According to various embodiments of the present disclosure, the electronic device may receive a speech signal input by a user 800 in operation 850. For example, the user 800 may make a speech input like "What time is it?" to ask for the present time.

According to various embodiments of the present disclosure, the electronic device (ASR module 810) may misrecognize the speech signal input by the user. For example, the electronic device 101 may convert the speech "What time is it?" intended by means of the speech signal to "What time is eat?".

According to various embodiments of the present disclosure, the electronic device 101 may send the erroneous converted natural language (i.e., "What time is eat?") to the speech recognition compensation module 840 at step 852. The electronic device 101 (speech recognition compensation module 840) may determine whether the received natural language exists in a 'reference offer sentence' or 'speech recognition-succeeded sentence' field of the previously created compensation table. For example, the electronic device 101 may look up the compensation table generated as shown in FIG. 7C to find out "What time is it?" matching with "What time is eat?".

According to various embodiments of the present disclosure, the electronic device 101 may send, at step 854, the NLU module 820 the converted natural language (e.g., "What time is eat?") and the speech recognition-succeeded natural language (e.g., "What time is it?") matching therewith. It may also be possible for the electronic device 101 to send specifically the speech recognition-succeeded natural language (e.g., "What time is it?") to the NLU module 820.

According to various embodiments of the present disclosure, the electronic device 101 (NLU module 820) may analyze the natural language received from the speech recognition compensation module 840 to find its meaning. For example, the electronic device 101 may analyze both the "What time is eat?" and "What time is it" and, as a consequence, verify that specifically "What time is it?" is meaningful.

According to various embodiments of the present disclosure, if it is determined that the natural language is meaningful, the electronic device 101 (NLU module 820) may request to the response offer module 830 for providing a response in reply to the query in operation 856.

According to various embodiments of the present disclosure, the electronic device 101 (e.g., response offer module 830) may execute, at step 858, a function corresponding to the speech signal in response to the user's request. For example, the electronic device 101 may reply to the user with the present time in response to the natural language "What time is it?".

Figure 9:
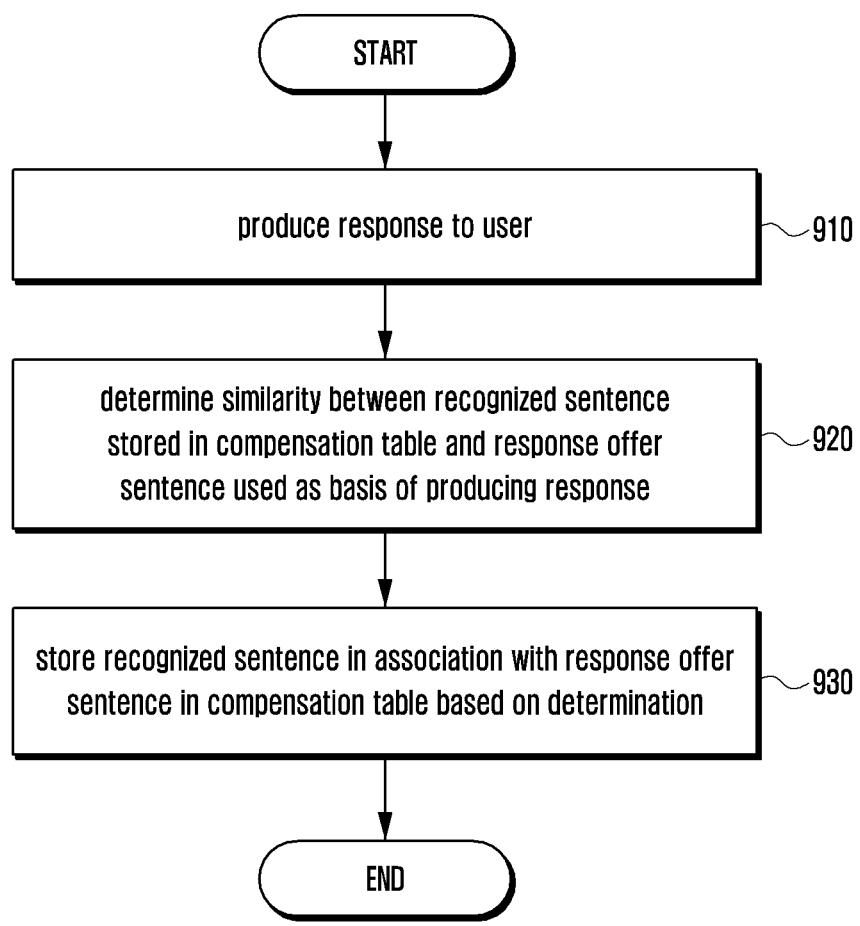
FIG. 9 is a flowchart illustrating a compensation table generation method of an electronic device according to various embodiments of the present disclosure.

FIG. 9 is a flowchart illustrating a compensation table generation method of an electronic device according to various embodiments of the present disclosure.

In reference to FIG. 9, the electronic device 101 (response offer module 430) may produce (generate, retrieve, etc.), at step 910, a response relevant as a reply to the recognized speech (e.g., as received from the NLU module).

According to various embodiments of the present disclosure, the electronic device 101 (speech recognition compensation module 440) may determine, at step 920, a similarity between the sentence stored in the 'recognized sentence' field of the compensation table and the sentence stored in the 'response offer sentence' field, which is used as the basis of producing the response at step 910. For example, the electronic device 101 may utilize a character string comparison and pronunciation similarity to determine the similarity between two natural language sentences. If the similarity is equal to or greater than a predetermined percentage (e.g., 80%), the electronic device 101 may determine that the sentence stored in the 'recognized sentence' field of the compensation table and the response offer sentence are similar to one another.

According to various embodiments of the present disclosure, the electronic device 101 (i.e., speech recognition compensation module 440) may store, at step 930, the reference offer sentence in the 'reference offer sentence' field in associating with the sentence stored in the 'recognized sentence' field of the compensation table based on the determination result made at step 920 (i.e., as a result of the determination of a match).

In this manner, the electronic device 101 is capable of facilitating execution of speech recognition function by automatically compensating for speech recognition failure with a corresponding associated 'response offer sentence' stored in the compensation table, resulting in improvement of user's convenience.

FIG. 10 is a flowchart illustrating a speech recognition function execution method of an electronic device according to various embodiments of the present disclosure.

In reference to FIG. 10, the electronic device 101 may receive a speech signal input by a user at step 1010 according to various embodiments of the present disclosure. For example, the electronic device 101 may receive the speech signal input by the user through a speech signal collection device such as the microphone 288, the speech recognition being performed on the speech signal.

According to various embodiments of the present disclosure, the electronic device 101 (ASR module 410) may perform speech recognition on the input speech signal at step 1020. For example, the electronic device 101 may convert the input speech signal to a 'natural language.' That is, the electronic device 101 may convert the input speech signal to a natural language text (e.g., text representing words and/or sentences) that invoke meaning.

According to various embodiments of the present disclosure, the electronic device 101 may determine where there is any compensation data corresponding to the converted natural language text. For example, the electronic device 101 may look up the compensation table that has been previously generated and stored, to determine whether any compensation data corresponding to the converted natural language text.

According to various embodiments of the present disclosure, if it is determined at step 1030 that there is any compensation data corresponding to the converted natural language text, the procedure may proceed to step 1040. At step 1040, the electronic device 101 (NLU module 420) may perform a natural language comprehension operation based on at least one of data related to the converted natural language and the compensation data.

According to various embodiments of the present disclosure, if it is determined at step 1030 that there is no compensation data corresponding to the converted natural language, the procedure may proceed to step 1050. At step 1050, the electronic device 101 (NLU module 420) may perform the natural language comprehension operation on the converted natural language at step 1050.

According to various embodiments of the present disclosure, the electronic device 101 (i.e., the response offer module 430) may produce at step 1060 a response to the user in reply to the speech input based on the operation performed at step 1040 or 1050.

According to various embodiments of the present disclosure, an electronic device may include a memory, a microphone, and a processor that is electrically connected to the memory and the microphone, wherein the memory may store instructions, executable by the processor, for receiving a first speech signal from a user at a first time point through the microphone, acquiring a first natural language corresponding to the first speech signal based on the first speech signal, storing, if it is impossible to process a user's request intended by means of the first speech signal based on the acquired first natural language, the first natural language as a compensation data in the memory, receiving a second speech signal from the user at a second time point through the microphone, acquiring a second natural language corresponding to the second speech signal based on the second speech signal, determining, if it is possible to process a user's request intended by means of the second speech signal based on the acquired second natural language, a similarity between the first and second natural languages and whether a difference between the first and second time points is less than a predetermined time duration, and storing, if the first and second natural languages are similar to each other and the difference between the first and second time points is less than the predetermined time duration, the compensation data in the memory to match the second natural language with the first natural language.

The processor may be configured to produce a response to the user in reply to the second speech signal based on the second natural language.

The first and second natural languages may be words or sentences.

The processor may be configured to determine the similarity based on at least one of character string comparison between the first and second natural languages and pronunciations.

The predetermined time duration may be long enough to determine that the first speech signal input at the first time point and the second speech signal input at the second time point are made substantially successively.

The processor may be configured to receive the first speech signal from the user at a third time point through the microphone, acquire the first natural language corresponding to the first speech signal based on the first speech signal, and retrieve the second natural language stored in match with the first natural language based on the compensation data.

The processor may be configured to produce a response to the user in reply to the second speech signal, although an input speech is the first speech signal, based on the second natural language.

The processor may be configured to acquire the first or second natural language from the storage of the electronic device or a server outside the electronic device.

The processor may be configured to produce the response via the memory of the electronic device or a server outside the electronic device.

According to various embodiments of the present disclosure, a method of an electronic device may include receiving a first speech signal from a user at a first time point, acquiring a first natural language corresponding to the first speech signal based on the first speech signal, storing, if it is impossible to process a user's request intended by means of the first speech signal based on the acquired first natural language, the first natural language as a compensation data, receiving a second speech signal from the user at a second time point, acquiring a second natural language corresponding to the second speech signal based on the second speech signal, determining, if it is possible to process a user's request intended by means of the second speech signal based on the acquired second natural language, a similarity between the first and second natural languages and whether a difference between the first and second time points is less than a predetermined time duration, and storing, if the first and second natural languages are similar to each other and the difference between the first and second time points is less than the predetermined time duration, the compensation data to match the second natural language with the first natural language.

The method may further include producing a response to the user in reply to the second speech signal based on the second natural language.

The first and second natural languages may be words or sentences.

Determining the similarity may include determining the similarity based on at least one of character string comparison between the first and second natural languages and pronunciations.

The predetermined time duration may be long enough to determine that the first speech signal input at the first time point and the second speech signal input at the second time point are made substantially successively.

The method may further include receiving the first speech signal from the user at a third time point, acquiring the first natural language corresponding to the first speech signal based on the first speech signal, and retrieving the second natural language stored in match with the first natural language based on the compensation data.

The method may further include producing a response to the user in reply to the second speech signal, although an input speech is the first speech signal, based on the second natural language.

Acquiring the first or second natural language may include acquiring the first or second natural language from a server inside or outside the electronic device.

Producing the response may include producing the response via a server inside or outside the electronic device.

According to various embodiments of the present disclosure, a computer-readable storage medium may store a program recorded thereon for executing operations of receiving a first speech signal from a user, acquiring a first natural language corresponding to the first speech signal based on the first speech signal, storing, if it is impossible to process a user's request intended by means of the first speech signal based on the acquired first natural language, the first natural language as a compensation data, receiving a second speech signal from the user at a second time point through the microphone, acquiring a second natural language corresponding to the second speech signal based on the second speech signal, determining, if it is possible to process a user's request intended by means of the second speech signal based on the second speech signal, a similarity between the first and second natural languages and whether a difference between the first and second time points is less than a predetermined time duration, and storing, if the first and second natural languages are similar to each other and the difference between the first and second time points is less than the predetermined time duration, the compensation data to match the second natural language with the first natural language.

The program is recorded thereon for further executing operations of receiving the first speech signal from the user at a third time point, acquiring the natural language corresponding to the first speech signal based on the first speech signal, and determining a meaning of the second natural language stored in match with the first natural language based on the compensation data.

As described above, the electronic device of the present disclosure is advantageous in terms of reducing the automatic speech recognition failure rate without improvement of the ASR engine. For example, the electronic device may generate a compensation table for compensating the recognition outcome for incompleteness so as to present a sentence coincident with the user's intention. Through this, if a sentence that is not coincident with the user's intention is input afterward, the electronic device may retrieve the sentence coincident with the user's intention corresponding to the sentence that is not coincident with the user's intention from the table and perform the NLU operation on the retrieved sentence. In this manner, the electronic device is capable of enhancing the speech recognition function to produce an outcome coincident with the user's intention without improvement of the ASR engine.

The term "module" used in the present disclosure may refer to a unit including one or more combinations of hardware, software, and firmware. The "module" may be interchangeable with a term, such as "unit," "logic," "logical block," "component," or "circuit". The "module" may be a minimum unit of a component formed as one body or a part thereof, may be a minimum unit for performing one or more functions or a part thereof, and may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

Modules or programming modules according to the embodiments of the present disclosure may include one or more components, remove part of the components described above, or include new components. The operations performed by modules, programming modules, or the other components, according to the present disclosure, may be executed in serial, parallel, repetitive or heuristic fashion. Part of the operations can be executed in any other order, omitted, or executed with additional operations.

Although embodiments of the disclosure have been described in detail above, it should be understood that many variations and utilizations of the basic inventive concept herein described, which may be apparent to those skilled in the art, will still fall within the embodiments of the disclosure as defined in the appended claims.

What is claimed is:
1. An electronic device, comprising:
a microphone;
at least one processor; and
a memory storing programming instructions executable by the at least one processor to cause the electronic device to:
receive, using the microphone, a first speech signal and extract a first natural language text from the received first speech signal,
in response to detecting that extraction of the first natural language text includes errors such that a request asso- ciated with the first speech signal is unprocessable, store the extracted first natural language text, receive, using the microphone, a second speech signal and extract a second natural language text from the received second speech signal, in response to detecting that the request is processable using the extracted second natural language text, detect whether a similarity between the first and second natural language texts is greater than a similarity threshold, and whether the second speech signal is received within a predetermined time duration of receiving the first speech signal, and when the similarity is greater than the similarity threshold, and when the first and second speech signals are received within the predetermined time duration, store the first natural language text in association with the second natural language text.

2. The electronic device of claim 1, wherein the instructions are further executable by the at least one processor to the electronic device to:

generate a response replying to the second speech signal based on the second natural language text.

3. The electronic device of claim 1, wherein the first and second natural language texts include words or sentences.

4. The electronic device of claim 1, wherein detecting whether the similarity is greater than the similarity threshold is based on at least one of:

execution of a character string comparison between the first and second natural language texts, and execution of a pronunciation comparison using generated estimations of the pronunciation of the first and second natural language texts.

5. The electronic device of claim 1, wherein detecting that the first and second speech signals are received within the predetermined time duration indicates the first and second speech signals are received substantially successively in time.

6. The electronic device of claim 1, wherein the instructions are further executable by the at least one processor to the electronic device to:

after receiving the first and second speech signal, receive a third speech signal using the microphone that repeats the first speech signal, extract a third natural language text corresponding to the third speech signal and detect that the third natural language text matches the first natural language text stored in association with the second natural language text, and retrieve the second natural language text based on the match.

7. The electronic device of claim 6, wherein the instructions are further executable by the at least one processor to the electronic device to:

generate a response to the third speech signal based on the second natural language text.

8. The electronic device of claim 1, wherein the instructions are further executable by the at least one processor to the electronic device to:

acquire at least one of the first and second natural language text from at least one of the memory and an external server.

9. The electronic device of claim 2, wherein the instructions are further executable by the at least one processor to the electronic device to:

retrieve the response from the memory or from an external server.

10. A method of an electronic device, the method comprising:

receiving using a microphone a first speech signal, and extracting a first natural language text from the received first speech signal;

in response to detecting by at least one processor that extraction of the first natural language text includes errors such that a request associated with the first speech signal is unprocessable, storing the extracted first natural language text;

receiving, using the microphone, a second speech signal and extracting a second natural language text from the received second speech signal;

in response to detecting that the request is processable using the extracted second natural language text, detecting whether a similarity between the first and second natural language texts is greater than a similarity threshold, and whether the second speech signal is received within a predetermined time duration of receiving the first speech signal, and when the similarity is greater than the similarity threshold, and when the first and second speech signals are received within the predetermined time duration, storing the first natural language text in association with the second natural language text.

11. The method of claim 10, further comprising generating a response replying to the second speech signal based on the second natural language text.

12. The method of claim 10, wherein the first and second natural languages texts include words or sentences.

13. The method of claim 10, wherein detecting whether the similarity is greater than the similarity threshold is based on at least one of:

execution of a character string comparison between the first and second natural language texts, and execution of a pronunciation comparison using generated estimations of the pronunciation of the first and second natural language texts.

14. The method of claim 10, wherein detecting that the first and second speech signals are received within the predetermined time duration indicates the first and second speech signals are received substantially successively in time.

15. The method of claim 10, further comprising:

after receiving the first and second speech signal, receiving a third speech signal using the microphone that repeats the first speech signal;

extracting the third natural language text corresponding to the third speech signal and detect that the third natural language text matches the first natural language text stored in association with the second natural language text; and retrieving the second natural language text based on the match.

16. The method of claim 15, wherein the instructions are further executable by the at least one processor to the electronic device to:

generate a response to the third speech signal based on the second natural language text.

17. The method of claim 10, acquiring at least one of the first and second natural language text from at least one of the memory and an external server.

18. The method of claim 11, wherein generating the response further comprises:

retrieving the response from the memory or from an external server.

19. A non-transitory computer-readable medium storing programming instructions, the programming instructions executable by at least one processor to cause an electronic device to:
- receive using a microphone a first speech signal at a first time point, and extract a first natural language text from the received first speech signal;
- in response to detecting that extraction of the first natural language text includes errors such that a request associated with the first speech signal is unprocessable, storing the extracted first natural language text;
- receive, using the microphone, a second speech signal and extract a second natural language text from the received second speech signal;
- in response to detecting that the request is processable using the extracted second natural language text, detect whether a similarity between the first and second natural language texts is greater than a similarity threshold, and whether the second speech signal was received within a predetermined time duration of receiving the first speech signal, and when the similarity is greater than the similarity threshold, and when the first and second speech signals are received within the predetermined time duration, storing the first natural language text in association with the second natural language text.

20. The computer-readable storage medium of claim 19, wherein
the programming instructions are further executable by the at least one processor to cause the electronic device to:
- after receiving the first and second speech signal, receive a third speech signal using the microphone that repeats the first speech signal;
- extract the third natural language text corresponding to the third speech signal and detect that the third natural language text matches the first natural language text stored in association with the second natural language text; and
- retrieve the second natural language text based on the match.

* * * * *